United States Patent [19]

George et al.

[11] 3,724,711
[45] Apr. 3, 1973

[54] COOKING UTENSIL ASSEMBLY

[75] Inventors: Daniel J. George, Lower Burrell; William C. Patterson, Turtle Creek, both of Pa.

[73] Assignee: Aluminum Company of America, Pittsburgh, Pa.

[22] Filed: Aug. 20, 1971

[21] Appl. No.: 173,655

[52] U.S. Cl. ................220/63 R, 220/17, 220/44 R
[51] Int. Cl. .............................................B65d 25/14
[58] Field of Search ............220/63 R, 65, 17, 44 R; 99/171 H, 181; 229/3.5 MF

[56] References Cited

UNITED STATES PATENTS

| 774,797 | 11/1904 | Sturges | 220/17 X |
|---|---|---|---|
| 1,301,596 | 4/1919 | Patton | 220/17 |
| 2,170,040 | 8/1939 | Stuart | 229/3.5 MF |
| 3,601,280 | 8/1971 | Mills | 220/63 R |
| 3,659,825 | 5/1972 | Reiter | 220/17 X |

*Primary Examiner*—Samuel B. Rothberg
*Assistant Examiner*—James R. Garrett
*Attorney*—Arnold B. Silverman

[57] ABSTRACT

A cooking utensil assembly including an outer metal container having a continuous base portion and a continuous generally upwardly directed annular sidewall. An inner metal container secured within the outer container and having a continuous bottom wall and a generally upwardly directed annular lateral wall. At least one venting passageway defined between an outwardly open venting channel positioned in the inner container lateral wall and the adjacent portion of the outer container sidewall. Venting conduits may be provided between radially disposed downwardly open venting channels in the inner container bottom wall and the underlying adjacent outer container base portion.

8 Claims, 9 Drawing Figures

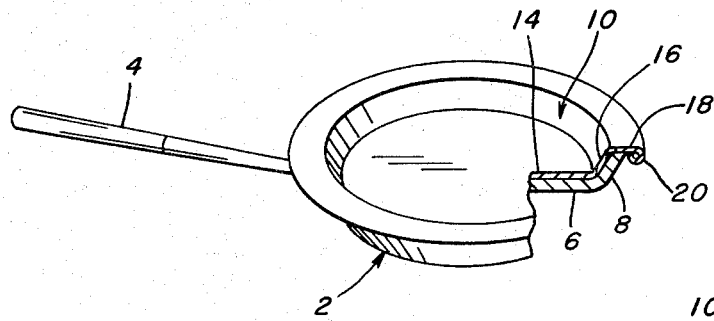
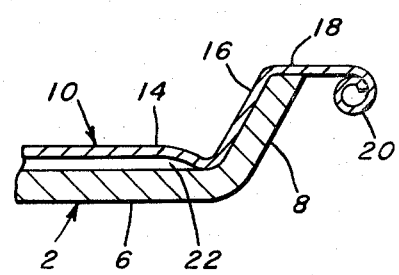
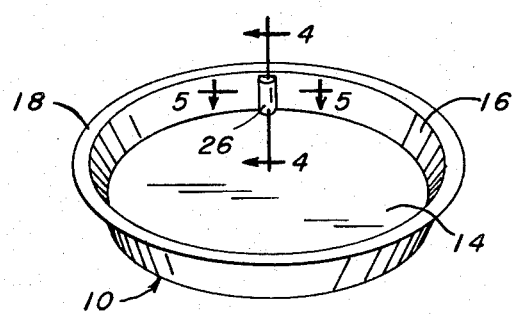
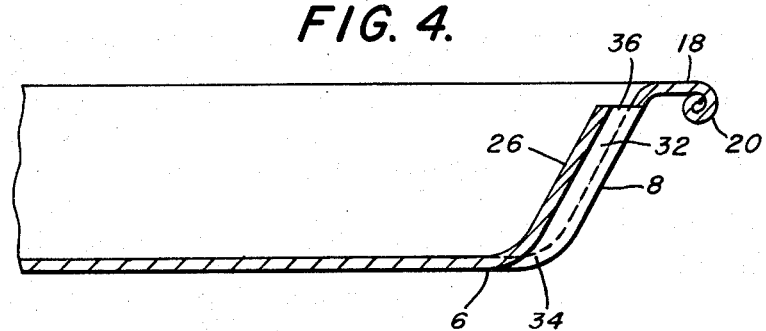
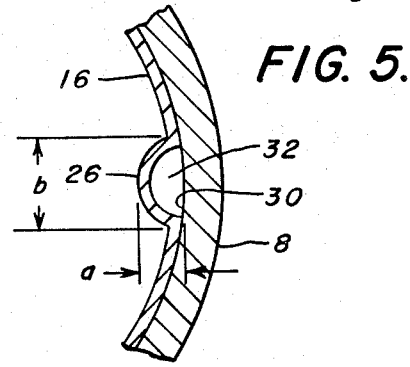

PATENTED APR 3 1973 3,724,711

COOKING UTENSIL ASSEMBLY

BACKGROUND OF THE INVENTION

1. Field of the Invention

This invention relates to a cooking utensil assembly which has an outer container and an inner container and is provided with integrally formed venting passageways which exhaust gaseous materials formed between the two containers during cooking. More specifically, this invention relates to such container assemblies wherein the sidewalls of the inner and outer containers are in intimate surface to surface engagement except in regions wherein the venting passageways are provided.

2. Description of the Prior Art

It has been known to provide various sorts of cooking utensil assemblies wherein an outer frame member has a handle portion and receives an inner container member which is frequently composed of a thinner material and is adapted to be discarded after use. Several cooking utensils of this type are provided with an outer container which has a generally solid base and discontinuous upstanding locking members which secure the inner container in place. See U.S. Pat. Nos. 391,524, 3,381,851 and 3,391,687. It has also been known to provide outer containers which have generally upwardly directed sidewalls emerging from several sides, but not all sides, of a generally rectangular outer container base. See U.S. Pat. Nos. 1,781,635 and 3,381,851.

With the above described forms of cooking utensil assemblies the outer container cannot be used as an independent cooking utensil as the discontinuities in the sidewalls preclude such usage. In container assemblies of this type where it is desired to provide the flexibility of using the outer container either as an independent utensil or with replaceable inserts which may be provided with special coatings, such as release coatings, certain problems can arise. One particular disadvantage relates to the need to provide firm securement of the inner container to the outer container. One preferred means of accomplishing this is to provide for firm frictional interengagement between the outer container sidewall and the inner container sidewall. As a result of the firm sidewall interengagement, moisture may become entrapped between the inner container base and the outer container base. This is particularly true in connection with inner containers which are provided with frozen food type products. Residual moisture from dishwashers may also create such an undesired accumulation. As the assembly is heated in cooking or heating the contents, the moisture will tend to vaporize with the resultant build-up of water vapor under pressure serving to urge the inner container base out of contact with the outer container base, thereby producing a substantial reduction in heat conductivity efficiency between the two base portions. This results in inefficient use of the heating energy and also prolongs the required cooking or preparing time.

There is, therefore, a need for a container assembly which provides the flexibility of using the outer container either independently or in combination with an inner container, while preserving the desired effective interengagement between the two containers which permits tilting of the container to remove the contents and/or clean the same without potentially hazardous accidental separation of the two containers. There remains the more substantial need of providing such an assembly wherein effective contact which affords maximum thermal efficiency by insuring effective heat conduction between the inner and outer container base walls is provided.

SUMMARY OF THE INVENTION

The above described need has been filled by the present invention. This invention provides an outer metal container which has a continuous base portion and a continuous generally upwardly directed annular sidewall. An inner metal container is secured within the outer container. The inner container is provided with a bottom wall and a generally upwardly directed annular lateral wall. At least one inwardly directed, outwardly open venting channel is integrally formed within the inner container lateral wall and has an opening adjacent the upper portion thereof. The venting channels cooperate with the outer container annular sidewall to define upwardly open venting passageways which permit discharge of steam and other undesired gaseous material from the region between the two containers outwardly into the surrounding atmosphere. The inner container lateral wall and outer container annular sidewall are in intimate surface to surface contact to provide for effective retention of the inner container within the outer container.

The bottom wall of the inner container may be provided with downwardly open generally radially oriented venting channels which cooperate with the underlying outer container base portion to define horizontal venting conduits. The horizontal venting conduits communicate with the generally vertical venting passageways to provide a continuous venting path.

The venting passageways of the sidewalls may have an upper opening which communicates with the interior of the inner container at a level below the upper extremity of the inner container lateral wall or an exteriorly disposed discharge outlet.

It is an object of this invention to provide a cooking utensil assembly wherein a functional outer container is effectively joined to a replaceable inner container in such a fashion as to produce maximum efficiency of heat conduction when employing the inner container as a portion of the cooking utensil assembly.

It is another object of this invention to provide such a cooking utensil assembly wherein integrally formed venting means are provided in order to exhaust undesired gaseous material from the region between the inner and outer containers.

It is another object of this invention to provide such venting means which may be partially formed simultaneously with the forming of the inner container and established automatically during assembly of the inner and outer containers by cooperation therebetween.

These and other objects of the invention will be more fully understood from the following description of the invention on reference to the illustrations appended hereto.

BRIEF DESCRIPTION OF THE DRAWINGS

FIG. 1 is a partially broken away perspective view of one form of cooking utensil assembly of this invention.

FIG. 2 is a partial cross sectional illustration of a portion of the cooking utensil assembly of this invention showing the outer periphery thereof.

FIG. 3 is a perspective view of one form of inner container structure of this invention.

FIG. 4 is a sectional view through 4—4 of FIG. 3 and shows a portion of the venting passageway.

FIG. 5 shows a cross sectional view taken through 5—5 of FIG. 3 showing a portion of the venting passageway.

DESCRIPTION OF THE PREFERRED EMBODIMENTS

Figure 6:
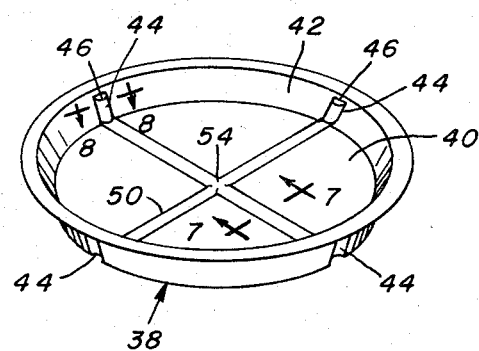
FIG. 6 shows a modified form of inner container structure employing additional venting means.

Referring now more specifically to FIG. 1, there is shown an outer container 2 which is provided with a handle 4. The outer container 2 has a base portion 6 and a generally upwardly directed annular sidewall 8. While sidewall 8 may be disposed generally perpendicular to base portion 6, it is generally preferable for ease of assembly to have the sidewall 8 extend angularly upwardly and outwardly. An inner container 10 has a bottom wall 14 and a generally upwardly directed annular lateral wall 16. The lateral wall 16 terminates at its upper extremity in an outwardly directed, generally horizontal flange 18, which in the form shown has a reentrant curled hollow bead portion 20.

Referring now to FIG. 2, a detail of the structure of the assembly will be considered. In order to provide for effective securement between the outer container 2 and the inner container 10, frictional engagement of the lateral wall 16 with the annular sidewall 8 is provided. This preferably results in substantially continuous surface to surface engagement between these two walls 8, 16. In this fashion, effective mechanical interengagement which resists undesired, potentially hazardous involuntary separation of the inner container 10 from the outer container 2 is provided. If desired, a suitable adhesive may be employed as the supplementary or sole retention means.

FIG. 2 shows the relationship of base portion 6 to bottom wall 14 in a partially exploded fashion in order to provide a more clear illustration of one of the problems which could arise in such utensil assemblies. It is noted that a void 22 is shown between bottom wall 14 and base portion 6. This void contains gaseous material under pressure which resulted from heating moisture entrapped between base portion 6 and bottom wall 14. The engagement between annular sidewall 8 and lateral wall 16 serves as a partial or complete seal to resist discharge of the vaporized moisture from the void 22. The pressure which builds up in void 22 tends to urge the bottom wall 14 upwardly away from base portion 6 and thereby destroys a significant portion of the desired highly efficient thermally conductive path between the containers 2, 10. This produces a meaningful reduction in thermal conductivity efficiency of the container assembly which results in waste of thermal energy and increased cooking or preparation time.

Reference is now made to FIGS. 3 through 5 wherein an important structural feature of the present invention is illustrated. As is shown in FIG. 5, the lateral wall 16 is provided with an inwardly projecting outwardly open generally U-shaped venting channel 26. The venting channel 26 cooperates with the inner surface 30 of sidewall 8 to define generally vertically oriented venting passageway 32 therebetween. This results in the outer surface of lateral wall 16 being in intimate surface to surface contact with surface 30 of sidewall 8 throughout the circumference of the containers 2, 10, except at those locations where passageways are defined by cooperation between a venting channel 26 and surface 30.

Figure 9:
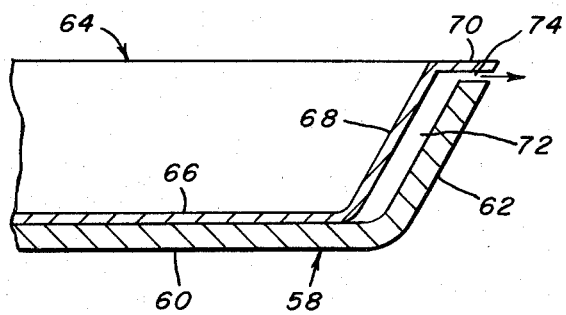
FIG. 9 shows a cross sectional illustration similar to FIG. 4, but having a modified form of inner container.

As is shown in FIG. 4, the passageway 32 originates with a portion 34 which is disposed adjacent the peripheries of base portion 6 and bottom wall 14. The passageway 32 extends continuously upwardly and terminates in an opening 36 which is disposed within the interior of inner container 10. One form of exterior discharge is illustrated in FIG. 9. For convenience of reference herein the use of the term "interior" and words of similar import as employed with reference to the inner container 10 shall mean the region defined by lateral wall 16 and bottom wall 14 and a plane taken through flange 18. The passageway 36 preferably has an average radial depth $a$ at its longitudinal midpoint of about one-sixteenth to three-eighths inch and an average circumferential width $b$ at its longitudinal midpoint of about one-sixteenth to one-half inch. It will be appreciated that moisture which is vaporized between the two containers 2, 10 will travel upwardly through passageway 32 and be discharged to the surrounding atmosphere through opening 36 which is disposed adjacent the outer periphery of the inner container. As a result, the tendency for vapor pressure to be built up and create relative separating movement between base portion 6 and bottom wall 14 will be arrested and the two walls 8, 14 will remain in effective thermal conducting relationship.

While, for convenience of illustration, FIGS. 3 through 5 have shown only a single vertical passageway, it will be appreciated that a plurality of passageways of this sort may be provided throughout the circumference of the inner container. In those instances where more than one such passageway 32 is provided, it is preferred that they be substantially symmetrically positioned with respect to the central axis of the inner container 10. Where more than one passageway 32 is employed, a decrease in cross sectional area of each passageway is permitted as the ability to avoid undesired pressure build-up is determined by the total cross sectional area of all of the vents.

Figure 7:
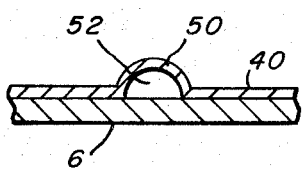
FIG. 7 is a cross sectional view taken through 7—7 of FIG. 6 showing a horizontal venting conduit of this invention.
Figure 8:
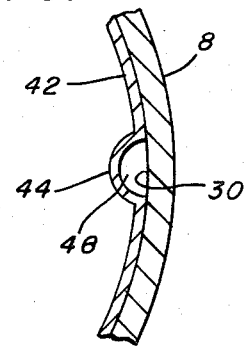
FIG. 8 shows a cross sectional illustration taken through 8—8 of FIG. 6 showing a form of vertical venting passageway of this invention.

Referring now to FIGS. 6 through 8, another embodiment of the invention will be considered. In the form of inner containers shown in these drawings the container has a circular bottom wall 40 and an annular lateral wall 42. The lateral wall 42 is provided with four integrally formed inwardly directed outwardly open venting channels 44 which are substantially identical with venting channels 26 which have been described above. These venting channels 44 terminate at their upper extremity in an opening 46 and are adapted to cooperate with inner surface 30 of outer container 2 to define a vertical venting passageway 48 in the manner shown in FIG. 8. As is shown in FIGS. 6 and 7, the bottom wall 40 is provided with a plurality of radially oriented upwardly directed, downwardly open generally U-shaped venting channels 50 which cooperate with base portion 6 in order to define horizontal venting conduits 52. The venting conduits, in the form shown, originate adjacent the center 54 of the bottom wall 40 and extend generally radially outwardly to the periphery of the bottom wall 40. The horizontal venting conduits 52 are so oriented as to communicate, at their outer extremity, with generally vertically oriented passageway 48. In this fashion, the region between the bottom wall 40 and base portion 6 is provided with a number of continuous integrally formed automatically established venting paths which serve to transport and discharge to the atmosphere undesired steam and other gaseous materials which otherwise would tend to accumulate between bottom wall 40 and base portion 6.

It will be noted that the structure of the inner container 10, 38 and outer container 2 are such that mere mechanical assembly in an ordinary manner causes the outer container 2 to cooperate with the inner container venting channels 26, 44 to establish the desired continuous venting conduits 52 and passageways 32, 48. This is accomplished without the need to index the inner container with respect to the outer container prior to assembly. It will also be noted that apart from openings 36, 46 in the passageways 32, 48, the inner container 10, 38 is continuous from the uppermost extremity of its lateral wall 16 through the entire bottom wall 14. As a result, the capacity of the inner container is substantial, while effective venting is nevertheless provided.

While it is preferred for ease of insertion and removal of the inner container 10, 38 into the outer container 2 to provide flange 18 and this flange 18 may also be employed as a stop which engages the upper portion of annular sidewall 8, if desired, flange 18 may be eliminated. In the event that flange 18 is not employed, the passageways 32, 48 may be permitted to remain disposed exteriorly of lateral wall 16, 42 and have a discharge opening 36 which discharges gaseous material exteriorly of the inner container and closely adjacent lateral wall 16, 42.

In the form shown in FIG. 9, the outer container 58 has a base portion 60 and a sidewall 62. The inner container 64 has a bottom wall 66 and a lateral wall 68 which terminates in an outwardly directed flange 70. A channel in lateral wall 68 cooperates with a sidewall 62 to define a vertical passageway 72 generally similar to passageway 48 defined by channel 44 and sidewall 8 but without an internal opening. The presence of flange 70 causes emerging gaseous material to be discharged outwardly in the direction indicated by the arrow. The upper extension 74 of passageway 72 is defined by flange 70 and sidewall 62 and directs the gaseous material to the assembly exterior. As is true of the other embodiments, if desired, a number of such vents may be provided with the total discharge capacity preferably approximating the anticipated venting requirements for the assembly.

It will be appreciated that in the preferred form of the invention both the base portion 6 of the outer container 2 and the bottom walls 14, 40 of the inner container 10, 38 are of flat configuration, apart from the venting channels 26, 50. As a result, maximum heat conductive efficiency through surface to surface engagement therebetween is provided. In the event that complementary irregularities are provided in one or both surfaces in the base portion 6 or bottom walls 14, 40, this would require either indexing of one with respect to the other in order to establish the cooking utensil assembly or subsequent reforming of one to conform to the configuration of the other. The generally flat configuration is, therefore, preferred.

While for purposes of illustration, inner and outer containers of generally round configurations have been shown, it will be appreciated that other geometric configurations, including oval and rectangular, may be employed if desired.

The inner and outer containers may be composed of any durable material of suitable thermal characteristics. A preferred material is aluminum which has high thermal conductivity. The inner container is preferably composed of aluminum foil or sheet and the outer container is preferably composed of aluminum sheet.

It will, therefore, be appreciated that the cooking utensil assembly of this invention provides for maximum thermal conductivity and resultant efficient cooking by providing integrally formed venting means which are automatically established during mechanical assembly of the inner and outer containers. The venting means are such that the undesired gaseous material is automatically discharged, either interiorly or exteriorly of the inner container, adjacent the periphery of the inner container lateral wall. The build-up of gaseous pressure between the inner and outer containers is effectively eliminated in this fashion. All of this is accomplished while maintaining the desired effective securement of the inner container within the outer container so that inadvertent separation is precluded.

Whereas particular embodiments of this invention have been described above for purposes of illustration, it will be apparent to those skilled in the art that numerous variations of the details may be made without departing from the invention as defined in the appended claims.

We claim

1. A cooking utensil assembly comprising
    an outer metal container having a continuous generally upwardly directed sidewall,
    an inner metal container disposed within said outer container having a continuous bottom wall and a generally upwardly directed lateral wall,
    at least one inwardly directed outwardly open venting channel integrally formed within said inner container lateral wall and having an opening adjacent the upper portion of said lateral wall,
    said inner container lateral wall and said outer container sidewall in intimate surface to surface contact except for those sectors within which said venting channels are disposed, and
    said venting channels cooperating with said outer container annular sidewall to define upwardly open venting passageways, whereby gaseous material generated between said inner and outer containers will be transported within said venting passageways and discharged to the surrounding atmosphere from said opening disposed adjacent the periphery of the inner container.

2. The cooking utensil of claim 1 wherein
said venting passageways have a lower opening communicating with the lower surface of said inner container bottom wall, and
said venting passageways have an opening communicating with the atmosphere adjacent the upper portion of said lateral wall.

3. The cooking utensil assembly of claim 2 wherein
said venting passageways have an opening communicating with the interior of said inner container.

4. The cooking utensil assembly of claim 2 wherein
said inner container bottom wall has at least one upwardly directed downwardly open venting channel which is generally radially oriented,
said venting channels cooperate with said outer container continuous base to define horizontally disposed venting conduits, and
the radially outer extremity of said horizontal venting conduits communicating with said venting passageways defined by said sidewall and said lateral wall venting channel.

5. The cooking utensil assembly of claim 2 wherein
said sidewall and said lateral wall are frusto-conical,
said base portion and said bottom wall are circular, and
said inner container and said outer container cooperate to define a plurality of upwardly directed venting passageways which are generally symmetrically positioned about said frusto-conical lateral wall.

6. The cooking utensil assembly of claim 5 wherein
each said venting passageway has an average radial depth at its longitudinal midpoint of about one-sixteenth to three-eighths inch and an average circumferential width at its longitudinal midpoint of about one-sixteenth to one-half inch.

7. The cooking utensil assembly of claim 6 wherein
said inner container has a radially outwardly directed flange emerging from the upper extremity of said lateral wall, and
said inner container has a lateral wall which is continuous except for said venting passageway openings.

8. The cooking utensil assembly of claim 6 wherein
said inner container has a lateral wall which is continuous.

* * * * *

UNITED STATES PATENT OFFICE
CERTIFICATE OF CORRECTION

Patent No. 3,724,711  Dated April 3, 1973

Inventor(s) Daniel J. George and William C. Patterson

It is certified that error appears in the above-identified patent and that said Letters Patent are hereby corrected as shown below:

Col. 4, line 45    Change "8" to --6--.

Signed and sealed this 1st day of January 1974.

(SEAL)
Attest:

EDWARD M. FLETCHER, JR.           RENE D. TEGTMEYER
Attesting Officer                  Acting Commissioner of Patents